United States Patent [19]
Robinson

[11] 3,803,607
[45] Apr. 9, 1974

[54] RADAR TRANSPONDER HAVING BUILT-IN CALIBRATION

[76] Inventor: David A. Robinson, 3709 Oleander Pl., San Diego, Calif. 92106

[22] Filed: Feb. 12, 1973

[21] Appl. No.: 331,426

[52] U.S. Cl............................ 343/17.7, 343/6.8 LC
[51] Int. Cl............................ G01s 7/40, G01s 9/56
[58] Field of Search........... 343/17.7, 6.5 R, 6.5 LC, 343/6.8 R, 6.8 LC

[56] References Cited
UNITED STATES PATENTS

| 3,728,728 | 4/1973 | Vogel | 343/17.7 |
| 3,353,181 | 11/1967 | Preuss | 343/17.7 |
| 3,573,826 | 4/1971 | Fredericks | 343/17.7 |
| 3,354,457 | 11/1967 | Pfab et al. | 343/17.7 |
| 3,544,996 | 12/1970 | Pile | 343/17.7 |

Primary Examiner—Maynard R. Wilbur
Assistant Examiner—G. E. Montone
Attorney, Agent, or Firm—R. S. Sciascia; G. J. Rubens; T. M. Phillips

[57] ABSTRACT

Calibration of a transponder is accomplished by precisely measuring the total delay time required from antenna to antenna. Stray signals from the transmitting antenna are allowed to enter the receiver and initiate a self-sustaining "ring-around" oscillation. That portion of the oscillation required for the pulse to travel internally through the transponder from the receiving antenna to the transmitting antenna is the total delay time.

9 Claims, 2 Drawing Figures

RADAR TRANSPONDER HAVING BUILT-IN CALIBRATION

BACKGROUND OF THE INVENTION

In the past the standard procedure of measuring the range accuracy of shipboard radar equipments was to provide a target consisting of a passive reflector situated on a known surveyed point, which is tracked by the ship's radar. This procedure is limited to the lower range scales (4,000 yards). In order to test higher range scales, an active transponder is used to produce an artificial range which is added onto the actual separation between the ship's radar and the transponder unit. The resultant sum of actual and artificial ranges is then compared to the range indicated on the shipboard equipments.

The transponder consists of three basic units, a receiver, a clock timer, and a transmitter. The receiver and transmitter are tuned to the frequency of the radar under test. Upon receiving the pulse transmitted by the ship's radar, the clock counts out a specified period of time and triggers the transmitter, which sends an artificial echo return pulse back to the ship's radar. This clock time is directly proportional to the desired artificial range. This artificial range is to be used as the standard against which to compare the radar unit under test, so it must be known to a high degree of accuracy. Since the range is directly related to the time delay, the problem becomes that of determining precisely the elapsed time between reception at the transponder of the pulse transmitted by the ship's radar, and the transmission of the return pulse by the transponder unit. The precision required necessitates that such factors as receiver and transmitter response times and propagation delays in the waveguides and coaxial cables be considered along with the clock time.

In order to obtain the required precision, the total delay time for a signal to complete the signal path through the transponder must be known.

In the past a variety of methods have been used to measure this delay time, most of which involved the use of an oscilloscope for the actual measurement. Measurements performed by these different techniques have yielded results which disagree. These methods involve artificially introducing a triggering signal and watching for the transmitted pulse on an oscilloscope. The time between them is taken as the total delay time, T. This method requires the selection of appropriate points on the leading edge of each waveform to serve as the beginning and end points of the delay period. This is critical because the risetimes of the pulses are on the order of 30 nanoseconds which is equivalent to 5 yards in range. The pulses also exhibit about 60 nanoseconds of jitter, which at the sweep speed used corresponds to a trace movement of 3 millimeters. This jitter must be visually averaged to an accuracy of 0.3 millimeter to meet the desired measurement accuracy capability of 1 yard. In addition, the scope sweep itself must be calibrated by observing the output waveform from a crystal oscillator of known frequency and adjusting the scope. This scope calibration is itself also subject to similar considerations regarding the necessary visual acuity. In order to achieve the time resolution necessary for the measurement, a sweep speed of 0.2 $\mu$s/cm would be necessary. This in turn means that the inherent delay can only be measured at a simulated range of 100 yards, since this is the only range for which T is small enough that both pulses can be displayed on the same sweep. The time base oscillator frequency of the delay clock is then measured and set using a digital counter.

Once these two measurements are made, the transponder is considered calibrated for any indicated range set into the delay controls. This statement however, makes two assumptions. The first is that the inherent delay value at any indicated range is equal to the value measured at 100 yards indicated range. The second assumption is that the counter circuits in the delay clock function perfectly at all ranges. These assumptions are reasonable, but cannot be proven by present calibration techniques.

SUMMARY OF THE INVENTION

The present invention provides a means of precisely determining the total delay time of a transponder from antenna to antenna by causing its own transmitter to provide triggering pulses that are received directly by its receiving antenna. These received trigger pulses will trigger the transponder just as any incoming pulse from a shipboard radar under test would. With each incoming pulse, a new clock timing cycle will be initiated, at the end of which a new pulse is transmitted. This pulse is received directly by the receiving antenna, thus initiating a new cycle, and the transponder will break into a self-sustaining "ring-around" oscillation. The frequency of the oscillation is determined by the time required for the pulse to travel through the space between the transmitting antenna and the receiving antenna, Ts, and the total time from antenna to antenna (time the signal is delayed in the transponder unit itself) which is precisely the desired quantity, T. Therefore, the transponder will oscillate with a period of oscillation equal to T + Ts, where Ts is a constant determined by the radiowave propagation velocity and the antenna spacing. T is a variable composed of the clock time, Tc, which is a function of simulated range, and Tid, the total inherent delay of the system. By means of a digital counter, the period of the oscillation is easily measured with high precision and the time, T, is obtained by subtracting the constant, Ts.

DESCRIPTION OF THE PREFERRED EMBODIMENTS

Figure 1:
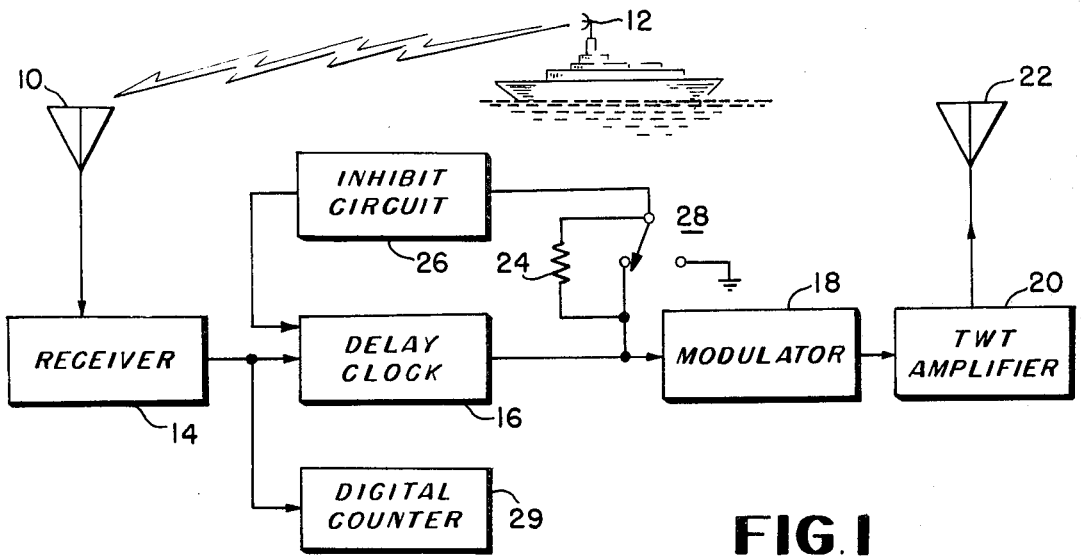
FIG. 1 is a block diagram of a radar transponder modified in accordance with the teaching of the invention.

Referring now to the drawings there is shown in FIG. 1 a receiving antenna 10 for receiving radar signals from a radar 12 under test. Signals received at 10 are fed into the receiver 14. Output pulses from receiver 14 are fed to delay clock 16 which provides an output pulse after a selected delay representing a given range.

The delayed output pulse is fed to modulator 18 and TWT amplifier 20 for transmission from antenna 22. In an operational situation, the output pulse from delay clock 16 is also fed through switch 28 to inhibit circuit 26 which generates a blanking pulse to prevent delay clock 16 from accepting signals received from antenna 10 via receiver 14 while a pulse is being transmitted from antenna 22. In the calibration mode, the output pulse from delay clock 16 is not fed to inhibit circuit 26, but is fed to ground through resistor 24 and switch 28. Any stray signals from antenna 22 received at antenna 10 will be passed by receiver 14 and accepted as a trigger by delay clock 16 which will then generate a delayed pulse. A sustained oscillation is initiated in a manner which will be described below.

Figure 2:
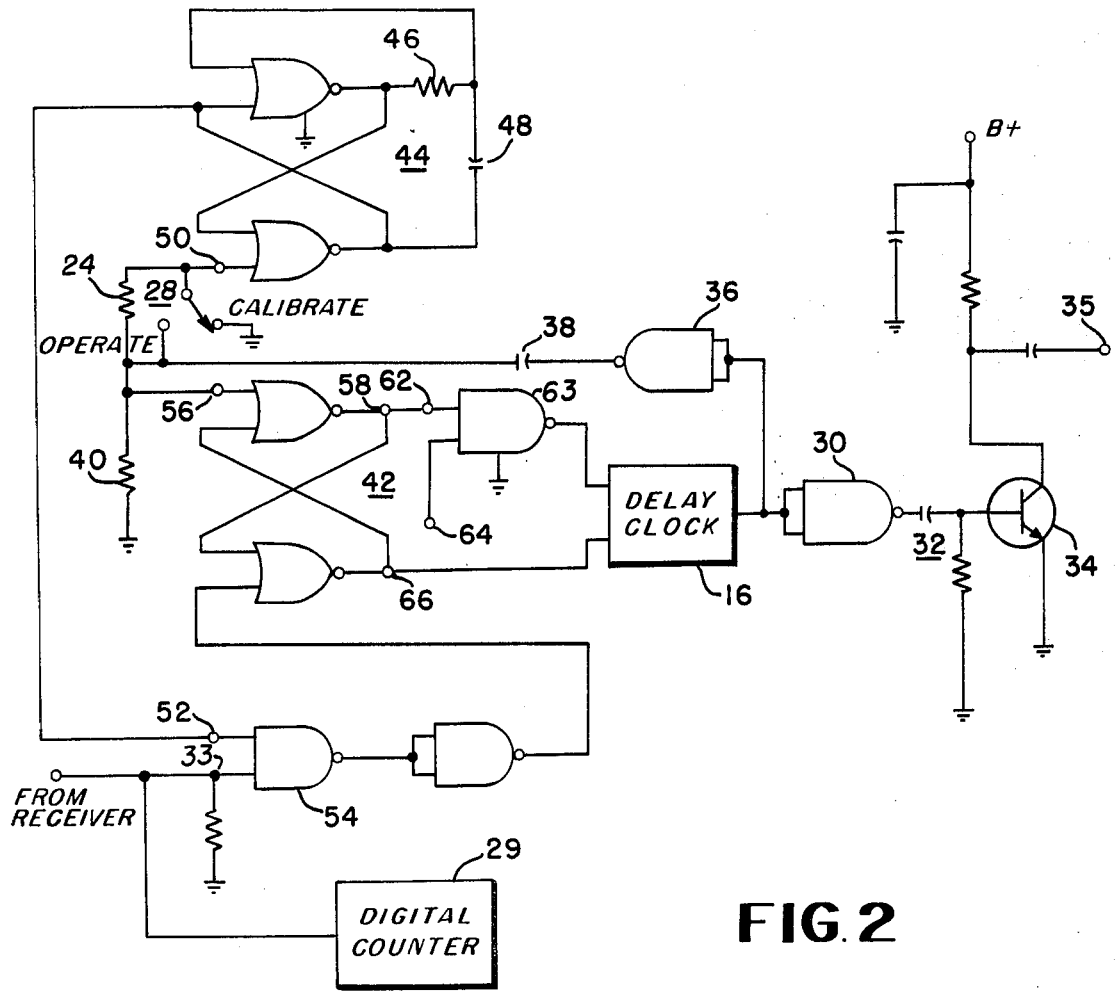
FIG. 2 is a more detailed diagram of the inhibit circuit of FIG. 1.

Referring now to FIG. 2 where there is shown in more detail the inhibit circuit 26 and delay clock 16, the positive video pulse from receiver 14 (FIG. 1) is received at terminal 33 of NAND gate 54. The other input to NAND gate 54 is the output from flip-flop circuit 44. A logical "1" to "0" transition at the output terminal of the digital delay clock 16 represents the end of the timing cycle and is connected via inverter 30, differentiator 32, and transistor 34 to provide the pulse at terminal 35 for triggering the modulator 18 (FIG. 1). The pulse out of delay clock 16 is also fed to inverter 36 whose positive-going output is differentiated by capacitor 38 and the parallel combination of resistor 40, and the input impedances of terminal 50 of flip-flop 44 and terminal 56 of flip-flop 42. The resultant reset pulse is applied to the inputs of flip-flops 42 and 44. Flip-flop 44 has resistor 46 and capacitor 48 added to form a monostable multivibrator. The output of flip-flop 44 is normally at the one level as this is the circuit's stable state. Upon arrival of the reset pulse at the input terminal 50, the output drops to the 0 level and remains there for a period of time determined by the time constant of resistor capacitor 46 and 48 and then returns to the 1 level. This blanking pulse is applied to terminal 52 of the input NAND gate 54, thus preventing it from accepting any signals from the receiver (specifically, that portion of the transmitted pulse which couples directly back into the receiving antenna) for as long as the blanking pulse is at the 0 level. The blanking pulse does not interfere with normal operation however, since the relatively slow pulse repetition rate of standard radars results in a separation between incoming pulses which is considerably greater than the duration of the blanking pulse.

The reset pulse also is applied to the reset input 56 of flip-flop 42 which causes terminal 58 to drop to the 0 level. This is connected to input terminal 62 of NAND gate 63, thereby preventing the clock pulses applied to terminal 64 from entering the counter circuits of delay clock 16. The conjugate output of flip-flop 42 at terminal 66 is fed to delay clock 16 for resetting the counter circuits in preparation for the next timing cycle.

At 20,000 yards and above, the delayed pulse at the output of delay clock 16 increases in magnitude and duration. This in turn causes the reset pulse at terminal 56 to change in length from about 0.2 µs to about 10 µs. Since the transmitter pulse requires only about 0.45 µs to ring-around and return through the receiver to the delay input, it and the reset pulse are present simultaneously at the inputs to flip-flop 42. This does not occur below 20,000 yards since the reset pulse has ended before the transmitted pulse returns. If both inputs are at the 1 level, both outputs drop to the 0 level, therefore terminal 62 of NAND gate 63 drops to the 0 level and the 16.392 MHz clock pulses at terminal 64 are prevented from reaching the counter circuits of the delay clock 16 and therefore no new timing cycle is initiated and the ring-around oscillations would cease.

To allow sustained ring-around oscillations, it is therefore necessary to ground terminal 50 of flip-flop 44 and thereby prevent it from generating a blanking pulse. This must be done without also grounding out the reset pulse, while at the same time ensuring that the reset pulse duration will be sufficiently short to avoid the problem discussed above. This means that the RC time constant of the circuit must remain the same when switch 28 is in either the operate or calibrate position. To achieve these goals, the values of capacitor 38 and resistor 40 should be chosen to provide a sufficiently short RC time constant. In practice, a value of 0.0005 µf for capacitor 38 and 330 ohms for resistor 40 have been found to be satisfactory. When switch 28 is in the calibrate position the input impedance of terminal 50 is replaced by a dummy load resistor 24 in order to preserve the RC time constant. A value of about 470 ohms has been found to work well.

In normal operation with switch 28 in the OPERATE position, the imcoming pulse from the ship's radar is detected by the receiver 14 and the resultant pulses are fed to terminal 33 of NAND gate 54. The inhibit signal on terminal 52 would be at the 1 level, hence NAND gate 54 will pass the received pulse and it will continue through an inverter and trigger flip-flop 42. This causes terminal 58 of flip-flop 42 to rise to the 1 level, which allows NAND gate 63 to pass the clock pulses from terminal 64 into the delay clock counter circuits. At the completion of the counting interval the output of delay clock 16 changed from the 1 to the 0 state. The transition is fed via inverter 30, differentiator 32 and transistor 34 to terminal 35, which feeds the signal to modulator 18. The delay clock output is also fed via inverter 36 and a differentiator through switch 28 to terminal 50 of monostable multivibrator 44. This then causes its output (normally 1) to change to 0 for a time period proportional to the time constant of capacitor 48 and resistor 46. This "blanking pulse" is fed to terminal 52 of NAND gate 54 and thus prevents the circuit from accepting any pulses from the receiver for as long as the output of flip-flop 44 remains at the 0 level. This prevents the transponder from triggering on its own transmitted pulse during normal operation. At the same time this is happening, the differentiated delay output is also fed to terminal 56 of flip-flop 42, which causes terminal 58 to drop to the 0 level, thus preventing the clock pulses from reaching the counter circuits. The conjugate output, terminal 66 of flip-flop 42 resets the counter circuits of the delay clock 16. By the time the blanking pulse has ended, the circuit has been reset and is ready to repeat the entire cycle upon receipt of the next pulse from the receiver.

In calibration mode with switch 28 in the CALIBRATE position, the delay output pulse from circuit 16 passes through inverter 36 and is differentiated by capacitor 38 and the parallel combination of resistor 40, the input impedance of terminal 56 and resistor 24, which switch 28 has substituted for the input impedance of terminal 50. By this means, terminal 50 has been grounded, and at the same time the time constant of the differentiator has been maintained equal to what it was when switch 28 was in the "OPERATE" position. Therefore the operation of flip-flop 42 remins unchanged, from normal operation. Because terminal 50 has been grounded, the output of flip-flop 44 remains in the 1 state and NAND gate 54 will accept any pulses coming from the receiver, specifically the transponder's own transmitted pulse which has traveled from antenna 22 to antenna 10. This pulse will trigger flip-flop 42 and thus initiate a new timing cycle, at the end of which the cycle will be repeated and the transponder will break into a "ring around" oscillation. A digital counter 29 is connected to terminal 33 to measure the period of these oscillations, Ts is subtracted from the counter reading, and the exact value of the delay, T, is determined to a high degree of accuracy.

Obviously many modifications and variations of the present invention are possible in the light of the above teachings. It is therefore to be understood that within the scope of the appended claims the invention may be practiced otherwise than as specifically described.

What is claimed is:

1. In a radar transponder having built-in calibration capability, in combination:
   a. a receiving antenna for receiving radar signals transmitted from a radar under test,
   b. a radar receiver coupled to said receiving antenna for detecting radar signals received at said receiving antenna,
   c. delay circuit means coupled to said receiver for generating an output signal delayed by a time interval proportional to the desired range in response to an output signal from said radar receiver,
   d. transmitter circuit means coupled to said delay circuit means for transmitting the delayed signal back to the radar equipment under test,
   e. feedback circuit means coupled from the output of said delay circuit means to the input of said delay circuit means for selectively rejecting, and accepting signals from said radar receiver when said transponder is in an operate and calibrate mode of operation, respectively,
   f. indicating means coupled to the output of said radar receiver for indicating the frequency of output pulses from said receiver.

2. The transponder of claim 1 wherein said feedback circuit means includes gate generating means responsive to an output pulse from said delay circuit for generating a blanking gate to prevent signals received by said radar receiver from entering said delay circuit for the duration of the transmitted pulse.

3. The transponder of claim 2 wherein said feedback circuit means includes disabling means for disabling said blanking gate generating means and allowing signals received by said radar receiver to enter said delay circuit during the duration of the transmitted pulse.

4. The transponder of claim 3 wherein said disabling means is a switch having a first position for coupling the output of said delay circuit means to said blanking gate generating means and a second position for coupling the output of said delay circuit means to ground in circuit with a load resistor.

5. The transponder of claim 1 wherein said feedback circuit means includes an inhibit circuit for rejecting signals from said radar receiver and an enabling circuit to insure operation of said delay circuit means when signals are being accepted from said radar receiver.

6. The transponder of claim 5 wherein said feedback circuit means includes gate generating means responsive to an output pulse from said delay circuit for generating a blanking gate to prevent signals received by said radar receiver from entering said delay circuit for the duration of the transmitted pulse.

7. The transponder of claim 6 wherein said feedback circuit means includes disabling means for disabling said blanking gate generating means and allowing signals received by said radar receiver to enter said delay circuit during the duration of the transmitted pulse.

8. The transponder of claim 7 wherein said disabling means is a switch having a first position for coupling the output of said delay circuit means to said blanking gate generating means and a second position for coupling the output of said delay circuit means to ground in circuit with a load resistor.

9. The transponder of claim 8 wherein the output of said delay circuit means is coupled to said inhibit circuit and said enabling circuit by means of a differentiating circuit having the same time constant when said switch is in the calibrate position as when said switch is in the operate position.

* * * * *